(12) United States Patent
Garois et al.

(10) Patent No.: US 7,851,553 B2
(45) Date of Patent: Dec. 14, 2010

(54) COMPOSITION COMPRISING AT LEAST TWO INCOMPATIBLE THERMOPLASTIC POLYMERS AND A COMPATIBILIZER, ITS METHOD OF PREPARATION AND ITS USE

(75) Inventors: Nicolas Garois, Amilly (FR); Philippe Sonntag, Hericy (FR); Logan Bouchereau, Chevillon sur Huillard (FR)

(73) Assignee: Hutchinson, Paris (FR)

( * ) Notice: Subject to any disclaimer, the term of this patent is extended or adjusted under 35 U.S.C. 154(b) by 910 days.

(21) Appl. No.: 11/501,256

(22) Filed: Aug. 3, 2006

(65) Prior Publication Data
US 2007/0191546 A1 Aug. 16, 2007

(30) Foreign Application Priority Data
Aug. 5, 2005 (FR) .................................. 05 08373

(51) Int. Cl.
*C08L 27/12* (2006.01)
*C08L 29/00* (2006.01)
*C08L 33/04* (2006.01)
*C08L 35/02* (2006.01)
*C08L 39/00* (2006.01)

(52) U.S. Cl. .................. 525/191; 525/199; 525/217; 525/221; 525/222; 525/232; 525/240; 525/241

(58) Field of Classification Search .................. 525/191, 525/199, 217, 221, 222, 231, 232, 240, 241
See application file for complete search history.

(56) References Cited

U.S. PATENT DOCUMENTS

| 6,207,752 B1 | 3/2001 | Abraham et al. |
| 6,579,944 B1 | 6/2003 | Abdou-Sabet et al. |
| 2006/0116475 A1 * | 6/2006 | Leibler et al. ............. 525/92 B |

FOREIGN PATENT DOCUMENTS

| EP | 0 493 811 A | 7/1992 |
| EP | 1 152 034 A | 11/2001 |
| FR | 2 820 138 A | 8/2002 |
| FR | 2 849 855 A | 7/2004 |

* cited by examiner

*Primary Examiner*—Nathan M Nutter
(74) *Attorney, Agent, or Firm*—Alston & Bird LLP

(57) ABSTRACT

The present invention relates to a composition comprising at least two incompatible thermoplastic polymers and at least one compatibilizer, to a method of preparing this composition, and to the use of said composition for the manufacture of thermoplastic articles or semi-finished products having, in particular, improved mechanical properties. A composition according to the invention is such that said polymeric compatibilizer includes at least two groups of polar and apolar units compatible with the respectively polymers, and it is characterized in that it comprises the product of a hot compounding reaction, in the presence of a crosslinking system, of said compatibilizer in the crosslinkable state with said thermoplastic polymers, in such a way that only said compatibilizer is crosslinked in said composition.

13 Claims, 1 Drawing Sheet

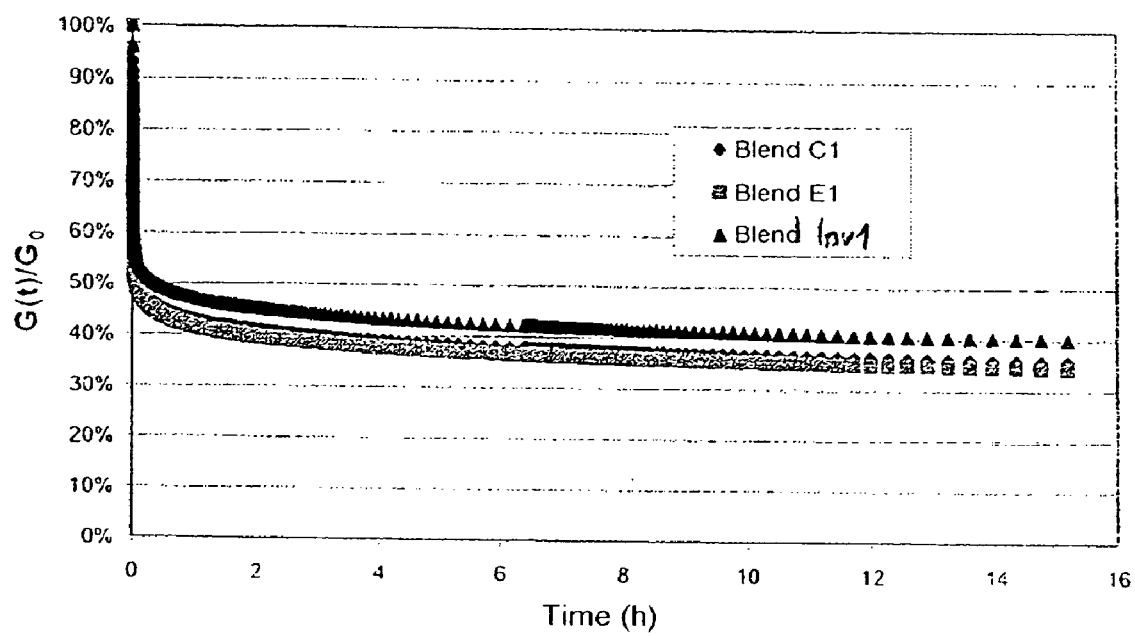
Single Figure

COMPOSITION COMPRISING AT LEAST TWO INCOMPATIBLE THERMOPLASTIC POLYMERS AND A COMPATIBILIZER, ITS METHOD OF PREPARATION AND ITS USE

FIELD AND BACKGROUND OF THE INVENTION

The present invention relates to a composition comprising at least two incompatible thermoplastic polymers and at least one compatibilizer, to a method of preparing this composition, and to the use of said composition for the manufacture of thermoplastic articles or semi-finished products having, in particular, improved mechanical properties.

In general, compositions or blends of polymers meet the requirement of having a set of properties that would be difficult or impossible to obtain with a single polymer. This usually applies to specific properties, such as solvent resistance, impact strength, rigidity, ductility, "barrier"-type properties, abrasion resistance, fire resistance, gloss, etc. Polymer blends may also meet the requirement of providing a lower manufacturing cost, by the addition of a low-cost polymer acting as diluent, and of improving the processibility and/or recyclability.

These polymer compositions are limited by the fact that they include polymers that are generally immiscible—typically being polar and apolar—and consequently require the incorporation of a compatibilizer (the reader may refer to the work by S. M. Krause "*Compatible Polymers*" in Polymer Handbook, J. Brandrup and E. H. Immergut, Editors, 3rd Edition, Wiley, New York, 1989). Such compatibilization is intended to improve the properties of the composition by reducing the interfacial tension and by improving the adhesion between the phases.

Various compatibilization techniques are used at the present time in compositions based on immiscible polymers:

- the addition of a small quantity (with a mass fraction typically ranging from 0.5% to 1%) of a cosolvent compatible with both polymers;
- the addition, with a mass fraction substantially between 1% and 20%, of a copolymer of the diblock or triblock type, having two blocks compatible with the two polymers respectively, a triblock copolymer improving the mechanical properties of the composition appreciably more than a diblock copolymer;
- the addition of a precrosslinked polymeric modifier of the core-shell type (e.g. of the ethylene/acrylate/maleic anhydride type or glycidyl methacrylate/ethylene/vinyl acetate type) with a higher mass fraction, usually between 20% and 35%, core-shell modifiers being indicated in the case of brittle blends so as to increase the impact strength; and
- the in situ generation of a compatibilizer, using the technique known as "reactive compatibilization", which generates a large interphase and makes it possible to retain the mechanical properties of the blends during particularly demanding conversion processes such as injection moulding (high pressure and high shear).

Patent document U.S. Pat. No. 6,887,940 itself discloses, in a composition comprising polar and apolar polymers consisting of a polyamide and a polyolefin respectively, the use of a compatibilizer consisting of a polyolefin having carboxylic acid groups formed by prior oxidation.

The advantages of these techniques are well known and indicated in the literature, such as for example in the article by A. Ajji and L. A. Utracki, Polym. Eng. Sci., 36, 1574, (1996) These techniques make it possible to lower the interfacial tension in polymer blends but they have the major drawback, however, of not giving the composition obtained, on the one hand, satisfactory cohesion and mechanical properties and, on the other hand, a stable morphology after the composition has been processed, for example after injection moulding or extrusion of the composition.

Another drawback of these techniques, such as those consisting of the addition of a core-shell polymeric modifier or of reactive compatibilization, lies in the complexity of their processing.

SUMMARY OF THE INVENTION

It is an objective of the present invention to remedy these drawbacks and this objective is achieved in that the Applicant has unexpectedly discovered that if at least two incompatible thermoplastic polymers, which are respectively polar and apolar, and at least one crosslinkable polymeric compatibilizer that includes at least two groups of polar and apolar units compatible with the polymers respectively, are subjected to a hot compounding reaction, in the presence of an appropriate crosslinking system, in such a way that the product of this reaction comprises these polymers which are not crosslinked and the compatibilizer which, on the contrary, is crosslinked, then a composition is obtained that has, in particular:

- an elongation at break substantially improved over that of the raw blend of these same polymers but without a compatibilizer;
- an elastic modulus similar to or greater than that of this raw polymer blend; and
- "yield" deformation properties, including in particular the yield stress, which are similar to those conferred on the same polymers by the same compatibilizer being in the uncrosslinked state in the composition.

It should be noted that the composition according to the invention, which comprises the product of this compounding reaction so that only the compatibilizer undergoes crosslinking, changing it from a crosslinkable initial state to a crosslinked final state (owing to sites that it has which render it crosslinkable), makes it possible to obtain for the composition a cohesion and, consequently, a set of mechanical and elastic properties which on the whole are improved compared with those of the prior art.

It should also be noted that this crosslinking of the interphase between the two polymers during the compounding operation, the interphase consisting of the sole compatibilizer, makes it possible to give the composition according to the invention a morphology devoid of coalescence, which is substantially maintained even after processing (e.g. after extrusion or injection moulding).

Furthermore, it should be noted that the existence of this crosslinked interphase also improves the solvent resistance of the composition according to the invention and its recyclability, owing to this absence of coalescence.

Advantageously, said crosslinking system is selected from the group consisting of systems comprising an organic peroxide, systems comprising a phenolic resin, systems comprising a metal oxide and systems comprising a diamine.

Preferably, said polymeric compatibilizer contains carbon-carbon double bonds, and said crosslinking system then advantageously comprises at least an organic peroxide, an activator and, optionally, sulphur.

In this case, said activator is advantageously selected from the group consisting of diacrylates, dimethacrylates, trimethacrylates, triallyl cyanurate, triallyl isocyanurate and N,N'-phenylenedimaleimide.

According to a first embodiment of the invention, said compatiblizer is a linear polystyrene/1,4-polybutadiene/polymethyl methacrylate triblock terpolymer.

According to a second embodiment of the invention, said compatibilizer is a random terpolymer comprising units deriving from ethylene, an acrylate and acrylic acid.

According to another feature of the invention, said thermoplastic polymers advantageously comprise:

- a polar polymer selected from the group consisting of polyvinyl acetates, polyacrylics (such as, non-limitingly, polymethyl methacrylate, polyacrylonitriles, styrene/acrylonitrile copolymers, acrylonitrile/butadiene/styrene copolymers and methyl methacrylate/acrylonitrile/butadiene/styrene copolymers), aliphatic-type ester homopolymers and copolymers (such as, non-limitingly, polyethylene terephthalate and polybutylene terephthalate), aliphatic-type amide homopolymers and copolymers (such as, non-limitingly, the polyamides-6, 6, -6,10, -6,12, -4,6, -6, -11 and -12), polyoxymethylenes, fluoropolymers (such as, non-limitingly, polytetrafluoroethylene, polychlorotrifluoroethylene and polyvinylidene fluoride), polycarbonates, polyimides, polyetherimides and polyether-block-amide copolymers; and
- an apolar polymer selected from polyolefins such as, non-limitingly, polyethylenes, polypropylenes, polyisobutylenes and polymethylpentenes.

Even more advantageously, said polar polymer is selected from the group consisting of homopolymers and copolymers of an aliphatic amide, polyoxymethylenes and polyvinylidene fluorides, and said apolar polymer is a high-density polyethylene or a polypropylene.

According to another feature of the invention, said composition advantageously comprises:

- said polar thermoplastic polymer with a mass fraction of between 1% and 90%;
- said apolar thermoplastic polymer with a mass fraction of between 90% and 1%; and
- said crosslinking system with a mass fraction of between 0.01% and 5%.

Even more advantageously, said composition comprises:

- said polar thermoplastic polymer with a mass fraction of between 40% and 60%; and
- said apolar thermoplastic polymer with a mass fraction of between 50% and 30%.

Preferably, the composition according to the invention includes said compatibilizer with a mass fraction of between 1% and 25% and, even more preferably, between 5% and 15%.

It should be noted that the compositions according to the invention may also include all or some of the other ingredients normally used in the thermoplastic semi-finished products or articles for which they are intended.

The method according to the invention for preparing a composition as defined above comprises an operation of thermomechanically mixing, in the presence of a crosslinking system, the compatibilizer in the crosslinkable state with each of said thermoplastic polymers, so as to crosslink only said compatibilizer within said composition.

Preferably, said compounding operation is carried out in a twin-screw compounder with a die temperature of between 200° C. and 220° C.

According to the invention, said composition is used for the manufacture of thermoplastic articles or semi-finished products having improved mechanical properties, which include the elongation at break, the yield strength and the elastic modulus.

BRIEF DESCRIPTION OF THE DRAWINGS

The aforementioned features of the present invention, as well as others, will be more clearly understood on reading the following description of several exemplary embodiments of the invention, given by way of illustration but implying no limitation in conjunction with the appended drawing in which:

the single FIGURE is a graph showing the variation as a function of time of the respective complex moduli of two "control" compositions and of a composition according to the invention, for assessing the creep-relaxation phenomenon.

DETAILED DESCRIPTION

In the examples that follow, the compounding conditions for each composition, "control" and according to the invention, were the following.

A compounder of the "corotating twin-screw" type having a diameter of 35 mm and a length/diameter ratio of 40 (ZK 35×40D from Collin). The profile of the twin-screw extruder consisted mainly of a transport zone and interspersed mixing zones. The temperature of the die was 200° C. in Example 1 and 210° C. in Examples 2 and 3. The screw speed was 200 rpm.

All the ingredients were mixed and metered with a throughput of 20 kg/h (using a K-SFS-24 from K-Tron) in order to introduce them into the twin-screw extruder.

The compositions were extruded in the form of rods 1.6 mm in diameter and these were cooled under water and then cut by an overhead granulator (LWRG 50H, from Leistritz) operating at a speed of 1000 rpm.

Tensile specimens of Hi type were manufactured from the granules by injection moulding. For this purpose, a 125-tonne plastic injection moulding machine (NT125 series, from Sandretto) was used. The temperature profile of the injection screw was a temperature gradient going from 160° C. at the feed to 200° C. at the nozzle. The mould temperature was 50° C.

The properties of the "control" compositions and of the composition according to the invention were experimentally evaluated as follows.

Mechanical Characterization:

Tensile tests were carried out on the H1 specimens with a tensile testing machine (5544 series, from Instron) at a pull speed of 20 mm/min. The method used allowed the Young's modulus, the yield stress, the yield strain, the stress at break and the elongation at break to be measured.

The yield stress, sometimes called the apparent elastic limit, is by definition the unitary load above which the phenomenon of flow is observed. More precisely, it is the upper yield point ($R_{eH}$), this being the value of the unitary load when, for the first time, a drop in load is actually observed.

Rheological Characterization:

Tests were carried out on an ARES (Advanced Rheometric Expansion System) machine which measures the loss angles (tan δ). A temperature scan from −100° C. to +100° C. (10° C./min ramp) was carried out for each of the compositions. The specimens were subjected to a strain of 0.1% at a frequency of 2 rad/s.

Composition Swelling Tests:

Each of these tests was carried out on four specimens with the dimensions 25×25×2 mm. The specimens were immersed in an FAMB test solvent. After 96 hours, the specimens were removed from the solvent and then wiped in order to weigh them (mass $m_{initial}$) and to measure them (volume $v_{initial}$).

After 24 hours of drying under a hood, the specimens were again weighed (mass $m_{final}$) and measured (volume $v_{final}$).

Percentage swelling is the following:

$$\% \text{ age mass swelling} = \frac{m_{final} - m_{initial}}{m_{initial}} \times 100$$

$$\% \text{ age volume swelling} = \frac{v_{final} - v_{initial}}{v_{initial}} \times 100.$$

The composition of the FAMB solvent was the following:

| | |
|---|---|
| toluene | 422.5 ml |
| isooctane | 253.5 ml |
| diisobutylene | 126.75 ml |
| ethanol | 42.25 ml |
| methanol | 150 ml |
| water | 5 ml |
| Total | 1000 ml |

Creep-relaxation Tests (Illustrated in the Single Figure)

Creep-relaxation tests were carried out (strain: 3%; temperature: 140° C.; duration: 16 h) on bars 39 mm in length cut from H1-type test samples. The measurements were made on an imposed-strain rheometer of the ARES type (from Rheometrics Scientific). To be able to compare the blends and be independent of the value of the complex modulus G, the parameter $G(t)/G_0$ was then calculated, $G_0$ being the maximum value of the complex modulus.

EXAMPLES

I. First Series of Tests:

Five "control" compositions A1, B1, C1, D1 and E1 and three compositions according to the invention Inv1, Inv1' and Inv1" were prepared in the aforementioned manner, the respective formulations of which are given in Table 2 below as volume fractions (V/V).

Composition A1 comprised only a polyoxymethylene copolymer (Hostaform C13021 from Ticona), as polar polymer, and composition B1 comprised only a propylene homopolymer (Moplen 2084 HEXP from Basell), as apolar polymer.

Composition C1 comprised only a blend of these two polymers, composition D1 further included a DICUP 40 peroxide crosslinking system and also an ALCAN activator in powder form, while composition E1 contained no crosslinking system but also included an uncrosslinked triblock copolymer SBM 012 (from Arkema), as compatibilizer.

Each composition according to the invention Inv1, Inv1', Inv1" comprised, in addition to this polymer blend, both the crosslinking system used in composition D1 and the compatibilizer used in composition E1, so that only this copolymer SBM 012 was crosslinked during the compounding.

The glass transition temperatures $T_g$ measured on an ARES II rheometer are given in Table 1 below for the polymers and the compatibilizer, each being in the pure state.

TABLE 1

| Product | Temperature $T_g$ (° C.) |
|---|---|
| Hostaform C13021 | −65/−8 |
| Moplen 2084 HEXP | −46/+3 |
| SBM 012 | −76/+18 |

These values correspond to a temperature scan at a rate of 10° C./min going from −100° C. to +100° C. for a strain of 0.1% and at a frequency of 2 rad/s.

The mechanical properties of the various compositions were measured on H1-type test specimens injection-moulded in a Sandretto moulding machine. The "transition" pressure (i.e. just before transition to the "hold" pressure) and the measurements of the mechanical properties are given in Table 2 below.

TABLE 2

| | A1 | B1 | C1 | D1 | E1 | Inv1 | Inv1' | Inv1" |
|---|---|---|---|---|---|---|---|---|
| Polyoxymethylene (HOSTAFORM C13021) | 100% | | 50% | 49.25% | 41.5% | 41% | 41% | 45% |
| Polypropylene (MOPLEN 2084 HEXP) | | 100% | 50% | 49.25% | 41.5% | 41% | 41% | 45% |
| Compatibilizer (SBM 012) | | | | | 17% | 17% | 16% | 8% |
| Peroxide (DICUP 40) | | | | 1% | | 0.6% | 1.2% | 1.2% |
| Activator powder (ALCAN) | | | | 0.5% | | 0.3% | 0.6% | 0.6% |
| Transition pressure (bar) | | | 740 | 570 | 880 | 630 | | |
| Injection time(s) | | | 0.57 | 0.61 | 0.56 | 0.57 | | |
| Composition swelling (%) | | | 9 | 10 | 7 | 5 | 5 | |
| Elongation at break (%) | 60 | 170 | 12 | 2.9 | 40 | 22 | 3.1 | 2.3 |
| Standard deviation | 15 | 20 | 2 | 0.2 | 5 | 2 | 0.7 | 0.6 |
| Yield Stress (MPa) | 52 | 20.2 | 32 | 26 | 33 | 32.5 | 23 | 22.3 |
| Standard deviation | 3 | 0.7 | 0.5 | 1 | 0.5 | 0.3 | 2 | 2 |
| Yield strain (%) | 4 | 3.4 | 4 | 2.8 | 13 | 10.1 | 3 | 2.3 |
| Standard deviation | 0.1 | 0.5 | 0.5 | 0.2 | 0.6 | 1 | 0.6 | 0.6 |
| Elastic modulus at 0.2% strain (MPa) | 1900 | 850 | 1200 | 1200 | 870 | 1170 | 1500 | 1600 |

It should be noted that the swelling values for the three compositions according to the invention Inv1, Inv1' and Inv1" are lower than those of the "control" compositions D1 and E1, which indicates that the SBM 012 compatibilizer has been crosslinked within the compositions according to the invention.

The glass transition temperatures ($T_g$) were also measured for several of these compositions according to the same protocol as for the pure products. The results are given in Table 3.

TABLE 3

| Composition | Glass transition temperature $T_g$ (° C.) |
|---|---|
| C1 | −67° C.; −45° C.; +3° C. |
| D1 | −67° C.; −45° C.; +3° C. |
| E1 | −65° C.; −47° C.; +3° C. |
| Inv1 | −65° C.; −47° C.; +3° C. |

"Control" composition C1 prepared without a compatibilizer had elastic modulus and elongation at break values consistent with the law of mixtures, as shown by the comparison with the values from the pure products (cf. Table 3). The $T_g$ values show that there is no interaction between the various constituents of composition C1, the temperatures remaining similar to those of the pure products.

The addition of the peroxide crosslinking system to this composition C1 gives degraded properties to "control" composition D1, as may be seen in Table 2. The yield stress and elongation at break decrease, while the elastic modulus is unaffected, when compared with the corresponding properties of composition C1. This shows that the two, polar and apolar, polymeric phases are not crosslinked by this crosslinking system.

The addition of the compatibilizer with no crosslinking system to the polymer blend, which gives "control" composition E1, results in better interpenetration of the phases as shown by the glass transition temperatures $T_g$, the difference between the two main peaks decreasing by 4° C. in the blend (cf. Table 3). From the standpoint of the mechanical properties, the elastic modulus of composition E1 is substantially lower than those of the non-compatibilized compositions C1 and D1. However, the other mechanical properties, such as the elongation at break and the yield stress, are improved.

The first composition according to the invention Inv1, which is characterized by the crosslinking of just a compatibilizer with a reduced amount of crosslinking system, combines the high elastic modulus of base composition C1 with the satisfactory yield strain of compatibilized "control" composition E1. The effect is particularly pronounced in the case of the yield strain and the elongation at break, which goes from 12% in the case of composition C1 to 22% in the case of composition Inv1.

Moreover, it should be noted that the interpenetration of the two, polar and apolar, polymeric phases in composition Inv1 remains comparable to that of the compatibilized "control" composition E1, as the glass transition temperatures $T_g$ show (cf. Table 3).

By increasing the quantity of crosslinking system it is possible to obtain elastic moduli well above what the law of mixtures would give (cf. second and third compositions according to the invention, Inv1' and Inv1"). The increased stiffness that characterizes these compositions Inv1' and Inv1" is accompanied by the disappearance of the yield point, the material losing its plastic characteristics in favour of elastic behaviour.

Creep-relaxation tests were also carried out, as explained above, on three bar specimens made from the three compositions C1, E1 and Inv1, respectively. As shown in the single FIGURE, which gives the results obtained in terms of the variation with time of the complex modulus, it is apparent that composition according to the invention Inv1 becomes less "softened" than "control" compositions C1 and E1, by retaining a higher modulus than the latter. Consequently, composition according to the invention Inv1 is less subject to the phenomenon of creep-relaxation than compositions C1 and E1 at the test temperature of 140° C. (corresponding substantially to the softening point of the polymers).

II. Second Series of Tests:

Three "control" compositions C2, D2 and E2 and one composition according to the invention Inv2 were prepared in the aforementioned manner, the respective formulations of which are given in parts by weight in Table 4.

Composition C2 comprised a blend of a polyamide/ethylene copolymer, substantially of the nylon-11 type (RILSAN B from Atofina), as polar polymer, and of the propylene homopolymer Moplen 2084 HEXP (from Basell), as apolar polymer.

Composition D2 further included the DICUP 40 peroxide crosslinking system and also ALCAN activator in powder form, while composition E2 contained no crosslinking system but also included the uncrosslinked triblock copolymer SBM 012 (from Arkema), as compatibilizer.

Composition according to the invention Inv2 comprised, in addition to this polymer blend, both the crosslinking system used in composition D2 and the compatibilizer used in composition E2, so that only this copolymer SBM 012 was crosslinked during the compounding.

TABLE 4

|  | C2 | D2 | E2 | Inv2 |
|---|---|---|---|---|
| Rilsan B copolyamide (nylon-11 type) | 104 | 104 | 104 | 104 |
| MOPLEN 2084 HEXP polypropylene | 90 | 90 | 90 | 90 |
| SBM 012 compatibilizer |  |  | 24 | 24 |
| DICUP 40 peroxide |  | 2.4 |  | 2.4 |
| ALCAN activator powder |  | 1.2 |  | 1.2 |
| Transition pressure (bar) | 600 | 350 | 490 | 410 |
| Composition swelling (%) | 6 | 8 | 8 | 4 |
| Elongation at break (%) | 65 | 20 | 60 | 40 |
| Yield stress (MPa) | 25 | 25 | 24 | 27 |
| Yield strain (%) | 17 | 15 | 18 | 18 |
| Elastic modulus at 0.2% strain (MPa) | 800 | 450 | 800 | 1060 |

It should be noted that the swelling of composition according to the invention Inv2 is less than that of "control" compositions C2, D2 and E2, which indicates that the SBM 012 compatibilizer has been crosslinked within composition Inv2.

The glass transition temperatures $T_g$ were also measured for these compositions, according to the same protocol as for the pure products. The results are given in Table 5 below.

TABLE 5

| Composition | Glass transition temperature $T_g$ (° C.) |
|---|---|
| C2 | −71° C.; −51° C.; +3° C. |
| D2 | −71° C.; −49° C.; +3° C. |
| E2 | −69° C.; −39° C.; +1° C. |
| Inv2 | −69° C.; −39° C.; −1° C. |

The glass transition temperatures $T_g$ are modified by the presence of the compatibilizer, as shown in Table 5 (cf. compositions E2 and Inv2). The crosslinking, which characterizes the compatibilizer in composition Inv2, does not modify the interpenetration of the phases since the glass transition temperatures are comparable to those observed in the case of the compatibilized "control" blend E2.

It is apparent from Table 4 that the yield stress and elongation at break of composition according to the invention Inv2 are similar to or better than those of base "control" composition C2, while the elastic modulus of composition Inv2 increases significantly since it goes from 800 MPa in the case of composition C2 to 1060 MPa (i.e. a greater than 32% increase).

III. Third Series of Tests:

Three "control" compositions C3, D3 and E3 and three compositions according to the invention Inv3, Inv3' and Inv3" were prepared in the aforementioned manner, the respective formulations of which are given in parts by weight in Table 6 below.

Composition C3 comprised a blend of the polyoxymethylene copolymer Hostaform C13021 (from Ticona), as polar polymer, and of the propylene homopolymer Moplen 2084 HEXP (from Basell), as apolar polymer.

Composition D3 further included the crosslinking system consisting of an SP1045 phenol-formaldehyde resin, while composition E3 contained no crosslinking system but also included an uncrosslinked random copolymer AT 325 of the ethylene/acrylate/acrylic acid type, as compatibilizer.

Each of the three compositions according to the invention Inv3, Inv3' and Inv3" comprised, in addition to this polymer blend, both the crosslinking system used in composition D3 and the compatibilizer used in composition E3, so that only this copolymer AT 325 was crosslinked during the compounding.

It should be noted that the second and third compositions according to the invention Inv3' and Inv3" differ from composition Inv3 only by the fact that they contain much smaller amounts of crosslinking resin.

TABLE 6

|  | C3 | D3 | E3 | Inv3 | Inv3' | Inv3" |
|---|---|---|---|---|---|---|
| HOSTAFORM C13021 | 141 | 141 | 141 | 141 | 141 | 141 |
| MOPLEN 2084 HEXP | 90 | 90 | 90 | 90 | 90 | 90 |
| AT 325 compatibilizer |  |  | 24 | 24 | 24 | 24 |
| SP1045 Resin |  | 4.8 |  | 4.8 | 1 | 0.5 |
| Transition pressure (bar) | 740 | 630 | 1120 | 850 | 980 | 900 |
| Elongation at break (%) | 12 | 15 | 65 | 29 | 70 | 80 |
| Standard deviation | 5 | 10 | 19 | 10 | 15 | 10 |
| Yield stress (MPa) | 32 | 32 | 50 | 35 | 33 | 33 |
| Standard deviation | 1 | 0.7 | 0.5 | 1 | 0.5 | 0.3 |
| Yield strain (%) | 4 | 3.4 | 6 | 6 | 9 | 10 |
| Standard deviation | 0.1 | 0.5 | 0.5 | 0.2 | 0.6 | 1.7 |
| Elastic modulus at 0.2% strain (MPa) | 1200 | 1100 | 1500 | 1100 | 1300 | 1300 |

It is apparent from Table 6 that the yield stress and elongation at break of each of compositions according to the invention Inv3, Inv3' and Inv3" are better than those of base "control" composition C3, while the elastic modulus of each composition Inv3, Inv3' and Inv3" is similar to or higher than that of this base composition C3.

It should also be noted that compositions according to the invention Inv3' and Inv3", which incorporate very small amounts of crosslinking resin, have elongation at break and elastic modulus values even more substantially improved over those of composition C3.

IV. Fourth Series of Tests:

Three "control" compositions C4, D4 and E4 and one composition according to the invention Inv∝ were prepared in the aforementioned manner, the respective formulations of which are given in parts by weight in Table 7.

Composition C4 comprised a blend of polyvinylidene fluoride (PVDF) KYNARFLEX 2750 (from Arkema), as polar polymer, and of a high-density polyethylene LAQTENE X10B, as apolar polymer.

Composition D4 further included the DICUP 40 peroxide crosslinking system and also the ALCAN activator in powder form, while composition E4 contained no crosslinking system but also included the uncrosslinked triblock copolymer SBM 012 (from Arkema), as compatibilizer.

The composition according to the invention Inv4 comprised, in addition to this polymer blend, both the crosslinking system used in composition D4 and the compatibilizer used in composition E4, so that only this copolymer SBM 012 was crosslinked during the compounding.

TABLE 7

|  | C4 | D4 | E4 | Inv4 |
|---|---|---|---|---|
| PVDF (KYNARELEX 2750) | 180 | 180 | 180 | 180 |
| HDPE (LAQTENE X10B) | 96 | 96 | 96 | 96 |
| Compatibilizer (SBM 012) |  |  | 24 | 24 |
| Peroxide (DICUP 40) |  | 2.4 |  | 2.4 |
| Activator powder (ALCAN) |  | 1.2 |  | 1.2 |
| Elongation at break (%) | 6 | 15 | 12 | 20 |
| Standard deviation | 1.6 | 3 | 2.4 | 1.2 |
| Yield stress (MPa) | 17 | 10 | 30 | 26 |
| Standard deviation | 0.5 | 0.1 | 0.4 | 0.6 |
| Yield strain (%) | 3.3 | 1.6 | 10 | 14 |
| Standard deviation | 0.3 | 0.1 | 1 | 1.6 |
| Elastic modulus at 0.2% strain (MPa) | 550 | 520 | 820 | 700 |
| Standard deviation | 40 | 30 | 50 | 40 |

It is apparent from Table 7 that the yield stress and elongation at break of composition according to the invention Inv4 are substantially better than those of base "control" composition C4, while the elastic modulus of this composition Inv4 is higher than that of base composition C4.

The invention claimed is:

1. A composition comprising at least two incompatible thermoplastic polymers, which are respectively polar and apolar, and a compatibilizing system which consists in at least one polymeric compatibilizer that includes at least two groups of polar and apolar units compatible with said polymers respectively, wherein the composition comprises the product of a hot compounding reaction, in the presence of a crosslinking system, of said compatibilizer in the crosslinkable state with said thermoplastic polymers, wherein in said composition, said compatibilizer is crosslinked and polar and apolar polymer are not crosslinked, wherein said crosslinking system is selected from the group consisting of systems comprising an organic peroxide, systems comprising a phenolic resin, systems comprising a metal oxide and systems comprising a diamine, and wherein the compatibilizer is present in the composition with a mass fraction of between 1% and 25% and the sole crosslinked compatibilizer forms an interphase between the two thermoplastic polar and apolar polymers.

2. The composition according to claim 1, wherein said polymeric compatibilizer contains carbon-carbon double bonds.

3. The composition according to claim 2, wherein said crosslinking system comprises at least an organic peroxide, an activator and, optionally, sulphur.

4. The composition according to claim 3, wherein said activator is selected from the group consisting of diacrylates, dimethacrylates, trimethacrylates, triallyl cyanurate, triallyl isocyanurate and N,N'-phenylenedimaleimide.

5. The composition according to claim 1 wherein said compatiblizer is a linear polystyrene/1,4-polybutadiene/polymethyl methacrylate triblock terpolymer.

6. The composition according to claim 1 wherein said compatibilizer is a random terpolymer comprising units deriving from ethylene, an acrylate and acrylic acid.

7. The composition according to claim 1 wherein said thermoplastic polymers comprise:
   a polar polymer selected from the group consisting of polyvinyl acetates, polyacrylics, aliphatic-type ester homopolymers and copolymers, aliphatic-type amide homopolymers and copolymers, polyoxymethylenes, fluoropolymers, polycarbonates, polyimides, polyether imides and polyether-block-amide copolymers; and
   an apolar polymer belonging to the polyolefin family.

8. The composition according to claim 7, wherein:
   said polar polymer is selected from the group consisting of homopolymers and copolymers of an aliphatic amide, polyoxymethylenes and polyvinylidene fluorides; and
   said apolar polymer is a high-density polyethylene or a polypropylene.

9. The composition according to claim 7, wherein it comprises:
   said polar thermoplastic polymer with a mass fraction of between 1% and 90%;
   said apolar thermoplastic polymer with a mass fraction of between 90% and 1%; and
   said crosslinking system with a mass fraction of between 0.01% and 5%.

10. The composition according to claim 9, wherein it comprises:
    said polar thermoplastic polymer with a mass fraction of between 40% and 60%; and
    said apolar thermoplastic polymer with a mass fraction of between 50% and 30%.

11. The composition according to claim 1, wherein it includes said compatibilizer with a mass fraction of between 5% and 15%.

12. A method of preparing a composition according to claim 1 which comprises an operation of thermomechanically mixing, in the presence of a crosslinking system, said compatibilizer in the crosslinkable state with each of said thermoplastic polymers, so as to crosslink only said compatibilizer within said composition.

13. The method of preparation according to claim 12, wherein said compounding operation is carried out in a twin-screw compounder with a die temperature of between 200° C. and 220° C.

* * * * *

UNITED STATES PATENT AND TRADEMARK OFFICE
CERTIFICATE OF CORRECTION

| | | |
|---|---|---|
| PATENT NO. | : 7,851,553 B2 | |
| APPLICATION NO. | : 11/501256 | |
| DATED | : December 14, 2010 | |
| INVENTOR(S) | : Garois et al. | |

It is certified that error appears in the above-identified patent and that said Letters Patent is hereby corrected as shown below:

<u>Column 4,</u>
Line 33, "Hi" should read --H1--.

<u>Column 10,</u>
Line 11, should read --composition according to the invention Inv4 were prepared in--.

Signed and Sealed this
Twenty-seventh Day of December, 2011

David J. Kappos
*Director of the United States Patent and Trademark Office*